Jan. 16, 1923. 1,442,167.
G. H. MAXWELL.
APPARATUS FOR HANDLING AND STORING MILK.
FILED FEB. 18, 1921.

G. H. Maxwell, Inventor.

By C. A. Snow & Co.
Attorneys

Patented Jan. 16, 1923.

1,442,167

UNITED STATES PATENT OFFICE.

GEORGE H. MAXWELL, OF EVANSVILLE, INDIANA, ASSIGNOR OF ONE-FOURTH TO LYEL STEINMETZ, OF EVANSVILLE, INDIANA.

APPARATUS FOR HANDLING AND STORING MILK.

Application filed February 18, 1921. Serial No. 446,062.

*To all whom it may concern:*

Be it known that I, GEORGE H. MAXWELL, a citizen of the United States, residing at Evansville, in the county of Vanderburg and State of Indiana, have invented a new and useful Apparatus for Handling and Storing Milk, of which the following is a specification.

This invention relates to an apparatus for handling and storing milk, one of its objects being to provide means whereby the milk can be caused to flow from the cow directly to a container provided therefor, said container being hermetically sealed and having a partial vacuum therein whereby the milk can be kept either at its natural temperature for a considerable period of time or can, if preferred, be cooled without contact at any time with the external atmosphere, stored and packed ready for shipping to the consumer.

A further object is to so prepare the container that any air remaining therein prior to the admission of the milk will be thoroughly sterilized and of the desired temperature.

With the foregoing and other objects in view the invention consists in certain novel details of construction and combinations of parts which will be hereinafter more fully described and pointed out in the claims.

In the accompanying drawings the preferred form of the container and apparatus used in connection therewith has been shown.

In said drawings

Figure 1:
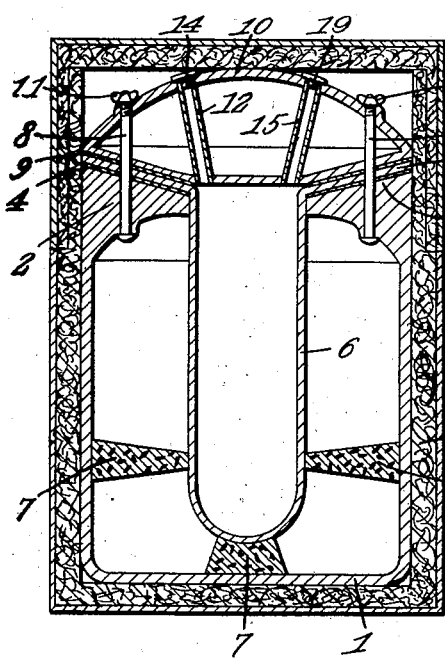
Figure 1 is a section through the container packed for shipment after having been filled with milk.
Figure 3:
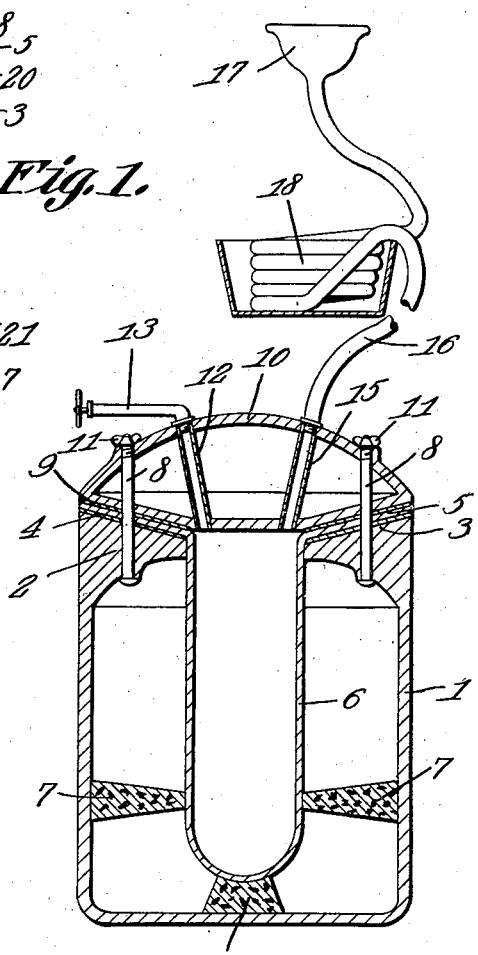
Figure 3 is a view showing the relative positions of the parts during the filling of the container.
Figure 2:
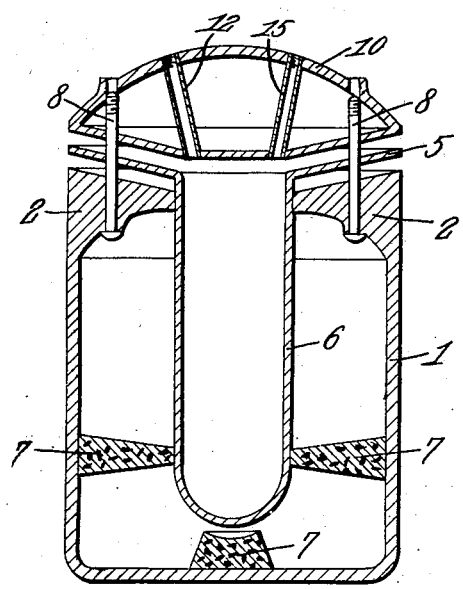
Figure 2 is a section through the container removed from its packing case and showing its several parts separated.

Referring to the figures by characters of reference 1 designates the outer casing of the container which can be made of glass, porcelain, or any other suitable material, there being provided at the upper end of this outer casing a thickened wall 2 the upper face of which is inclined inwardly and downwardly toward the center as shown at 3 thus to provide a seat which is tapered. This seat is adapted to support a gasket 4 of any suitable sealing material or can be provided with a covering of paraffin or the like which is the equivalent of a gasket. On this gasket of sealing material is supported a flange 5 formed on and extending around the open end of the inner casing 6 of the container which likewise can be made of glass or any other suitable material. The two casings may be separated by spacing blocks 7 of cork or any other suitable non-conducting material.

Extending upwardly through the thickened upper end 2 of the outer casing 1 are coupling pins 8 which are designed to extend through the flange 5. A gasket 9 of any suitable material such as paraffin or the like is adapted to be placed on the flange 5 and to be engaged by the lower surface of a hollow cover 10 which can be made of glass or any material desired. The pins 8 extend through this cover and by tightening nuts 11 on the pins the various parts can be clamped tightly together so as to be sealed effectually.

An outlet tube 12 is formed in or secured to the cover 10 and communicates with the interior of the inner casing 6. The upper end of this tube 12 is adapted to be connected to a suction pump 13 which is removably mounted and can be replaced by a plug such as shown at 14 in Figure 1. Another tube 15 is formed in or secured to the cover 10 and its upper end is adapted to be detachably engaged by a feed tube 16 which can be extended from a cup 17 such as used upon ordinary milking appliances for engagement with the udder. This tube 16 can be extended directly from the cup 17 to the tube 15 or, if preferred, can be merged into a cooling coil such as indicated generally at 18. This cooling coil is only used when the apparatus is to be employed for storing cooled milk. Where the milk is to be retained at body heat or substantially body heat the coil 18 obviously is not used for cooling purposes.

In carrying out the process the parts of the container are separated in a room containing sterilized air of a temperature equal to or slightly above the normal heat of the milk. While in this room the parts are assembled, the inner casing 6 being inserted into the outer casing so as to leave a body of warm air around the inner casing. Sealing material is placed above and below the flange 5, the cover 10 is placed in position, and the parts are bound together tightly. By means of the pump 13 a partial vacuum is formed within the inner casing 6 after which the cup 17 is applied to the cow and the milk caused to flow therefrom through the tube 16 and into the inner casing 6. After the casing has been entirely or partially filled the pump 13 and the tube 16 are removed and are replaced by the plug 14 and another plug 19 respectively.

With the milk thus delivered into the inner casing 6 it is kept practically at body heat and as it has not had an opportunity to come into contact with any of the external atmosphere but only with the small amount of sterilized air left within the partial vacuum, it will be apparent that when delivered to the consumer it will be in a pure wholesome state. In transporting the container it can be placed in a case 20 of fiber, wood or the like provided with a packing 21 of straw, asbestos or any other heat insulating material so that the heat of the milk will be retained for a long period.

When it is desired to cool the milk while delivering it to the container but without bringing it into contact with the external atmosphere, it is not necessary to assemble the parts of the container in a room containing heated air although the air should be sterilized before the parts are assembled. The air is then partly extracted by means of the pump 13 and the milk, when flowing into the inner casing 6 caused to flow through the cooling coil 18 so that the temperature will be lowered to a desired degree. The parts are then disconnected from the cover 10, said cover is sealed and the container is packed as heretofore described and then shipped to the consumer.

It is to be understood that various modifications may be made in the construction and arrangement of the parts without departing from the spirit of the invention as claimed.

It is to be understood that if desired the tube 16 can be provided with double walls spaced apart by heat insulating material or with a partial vacuum between them so that the milk will not be cooled when the cooling apparatus is not in use.

What is claimed is:—

1. A container for milk and the like comprising nesting inner and outer casings having an air space therebetween, a hollow cover extending over the casings and connected thereto, means detachably mounted on the cover for extracting air from the inner casing, and means detachably connected to the cover for directing fluid into the inner casing following the extraction of the air.

2. A container of the class described comprising an outer casing, an inner casing, said outer casing having a seat at one end, a flange upon the inner casing overhanging the seat, a cover overhanging the flange and extending over the inner and outer casings, sealing means between the flange and cover and between the flange and the outer casing, means extending through the flange and engaging the cover and the wall of the outer casing for binding the parts together to seal the contents of the inner casing, means connected to the cover for withdrawing air from the inner casing, and means connected to the cover for directing liquid into the inner casing following the withdrawal of the air.

In testimony that I claim the foregoing as my own, I have hereto affixed my signature in the presence of two witnesses.

GEORGE H. MAXWELL.

Witnesses:
JOHN T. FARRIS,
GEO. M. GRIMM.